UNITED STATES PATENT OFFICE.

SAMUEL BAXENDALE, OF BOSTON, MASSACHUSETTS.

IMPROVEMENT IN LUBRICATING-PACKINGS FOR JOURNALS, SHAFTING, &c.

Specification forming part of Letters Patent No. 145,384, dated December 9, 1873; application filed October 28, 1872.

*To all whom it may concern:*

Be it known that I, SAMUEL BAXENDALE, of Boston, Massachusetts, have invented an Improved Lubricating-Packing for Journals, Shafting, &c., of which the following is a specification:

This invention consists in preparing a cheap elastic lubricating-packing, to be used in place of cop-waste for journal and shaft packing, and analogous purposes. It is prepared by mixing pretty intimately fibrous asbestus with wool-waste, or shoddy based upon wool, in proportions of from a quarter to three-quarters of asbestus with from three-quarters to a quarter of wool-waste. I do not, however, confine myself to these proportions; though, for most purposes, this range of proportions will be sufficient. When thus intimately mixed, it is the best packing for hot boxes I have yet seen.

Asbestus alone is apt to pulverize and pack. Wool-waste alone is also apt to pack, although carpet-yarns and hard ends have been found superior to cotton-waste for boxes. Common wool-waste, the strippings of cards, knots, tag-locks, and other inferior wool or woolen mixtures, can be used for my packing, which are much cheaper articles, though unsuitable alone for packing.

I put this through a picker, or some equivalent machine, such as what is called a "wool-duster." This lightens it up and opens the knots and mat of the wool. I then take pieces of asbestus, about as big as the finger—the Italian is the best, but any kind that strings well will answer—and run it through a similar machine, which separates it coarsely into fiber. I then take the fibrous asbestus and the picked or dusted wool-waste and run them together, mixed in proper proportions, through a similar machine, picker, wool-duster, or the like. This will roughly, but thoroughly and intimately, mix the two. The wool-waste thus combined with fibrous asbestus holds oil well and lies up to the shaft admirably. The asbestus is itself a lubricant, and though apt to pulverize and pack by itself, these tendencies are very slight when combined as described.

I do not claim the above as a steam-packing, because it is unsuitable, not being sufficiently compact; but

I claim and desire to secure by Letters Patent—

The combined lubricating-packing for shafts and journals, composed of a mixture of fibrous asbestus and wool-waste, substantially as described.

SAMUEL BAXENDALE.

Witnesses:
E. A. M. CLARKE,
F. F. RAYMOND.